(12) United States Patent
Anderson et al.

(10) Patent No.: US 10,343,353 B2
(45) Date of Patent: Jul. 9, 2019

(54) METHOD OF CURING A COMPOSITE ARTICLE USING DIFFERENTIAL VACUUM

(71) Applicant: The Boeing Company, Chicago, IL (US)

(72) Inventors: Michael R. Anderson, Renton, WA (US); Grant C. Zenkner, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 14/876,715

(22) Filed: Oct. 6, 2015

(65) Prior Publication Data

US 2017/0095984 A1    Apr. 6, 2017

(51) Int. Cl.
| | | |
|---|---|---|
| *G01M 3/26* | (2006.01) | |
| *B29C 70/34* | (2006.01) | |
| *B29C 70/44* | (2006.01) | |
| *B29C 35/02* | (2006.01) | |
| *B29C 33/00* | (2006.01) | |

(Continued)

(52) U.S. Cl.
CPC ........ *B29C 70/342* (2013.01); *B29C 33/0038* (2013.01); *B29C 35/0227* (2013.01); *B29C 35/0288* (2013.01); *B29C 37/0064* (2013.01); *B29C 70/44* (2013.01); *B29C 70/443* (2013.01); *G01M 3/26* (2013.01); *B29K 2823/22* (2013.01); *G01M 3/02* (2013.01)

(58) Field of Classification Search
CPC ................. B29C 70/42–48; B29C 70/443
See application file for complete search history.

(56) References Cited

U.S. PATENT DOCUMENTS

| | | | |
|---|---|---|---|
| 6,017,484 A | 1/2000 | Hale | |
| 6,482,497 B1 * | 11/2002 | Kay | .............. B29C 37/0064 428/105 |
| 6,761,783 B2 | 7/2004 | Keller et al. | |

(Continued)

FOREIGN PATENT DOCUMENTS

| | | | |
|---|---|---|---|
| CN | 104861895 | | 8/2015 |
| CN | 104861895 A | * | 8/2015 |

OTHER PUBLICATIONS

CN-104861895-A Machine Translation, Jun. 6, 2018 (Year: 2018).*

(Continued)

*Primary Examiner* — Benjamin A Schiffman

(57) ABSTRACT

A method of curing a composite layup may include applying an inner bag vacuum pressure to an inner bag chamber and an outer vacuum pressure to an outer vacuum chamber. The vacuum inner bag chamber may be formed by a vacuum bag covering a composite layup and sealed to a forming tool with an inner bag chamber seal. The inner bag vacuum pressure may be no less than the outer vacuum pressure. The temperature of the composite layup may be increased to an elevated temperature to initiate a temperature hold period. The method may additionally include venting the outer vacuum chamber to atmosphere to initiate an outer vacuum chamber venting period during the temperature hold period, and applying compaction pressure to the inner bag chamber seal during the outer vacuum chamber venting period. The outer vacuum pressure may be re-applied to the outer vacuum chamber to terminate the outer vacuum chamber venting period.

22 Claims, 9 Drawing Sheets

(51) Int. Cl.
*B29C 37/00* (2006.01)
*G01M 3/02* (2006.01)

(56) References Cited

U.S. PATENT DOCUMENTS

| | | |
|---|---|---|
| 7,186,367 B2 | 3/2007 | Hou et al. |
| 7,842,209 B2 | 11/2010 | Wilenski et al. |
| 8,066,503 B2 * | 11/2011 | Hawkins ............... B29C 70/342 425/388 |
| 8,628,639 B2 | 1/2014 | Thompson et al. |
| 8,840,393 B2 | 9/2014 | Wilenski et al. |
| 8,986,479 B2 | 3/2015 | Evens et al. |
| 2005/0073076 A1 | 4/2005 | Woods et al. |
| 2011/0146906 A1 | 6/2011 | Anderson et al. |

OTHER PUBLICATIONS

Extended European Search Report for EP 16 18 0098, dated Mar. 17, 2017.
Korean Patent Office, Korean Office Action for Appl. No. EP 10-2016-0129236, dated Feb. 11, 2019.

\* cited by examiner

METHOD OF CURING A COMPOSITE ARTICLE USING DIFFERENTIAL VACUUM

FIELD

The present disclosure relates generally to manufacturing composite articles and, more particularly, to a method of curing a composite layup in an out-of-autoclave process.

BACKGROUND

The manufacturing of fiber-reinforced composite articles may include laying up composite plies over a forming tool to form a composite layup. Heat and pressure may be applied to the composite layup to consolidate and cure the composite layup into a cured composite article. Conventional methods of curing a composite layup may involve the use of an autoclave to provide heat and compaction pressure to the composite layup to achieve the desired mechanical properties in the cured composite article. The application of compaction pressure may facilitate the evacuation of entrapped moisture, air, and/or volatiles from the composite layup during consolidation and curing such that low porosity and high strength may be achieved in the cured composite article.

Unfortunately, the use of an autoclave for manufacturing a composite article may require extended periods of time to heat the composite layup to the required consolidation and curing temperatures and extended periods of time to cool the composite layup to ambient temperature after curing. The amount of time required to process and cure a composite layup in an autoclave may be prohibitive for large-scale production programs requiring high part-production rates. In addition, autoclaves are generally expensive to construct and operate. Furthermore, the internal size of an autoclave may represent an upper limit on the size of a composite layup that can be processed. A further drawback associated with autoclaves is that a portion of the moisture, air, and/or volatiles may remain inside the composite layup after curing.

Double-vacuum-bag processing allows for consolidation and curing of a composite layup without the need for an autoclave. In some examples, a double-vacuum-bag system may include inner and outer vacuum bags applied over a composite layup and sealed to a layup mandrel, cure tool, or forming tool. An outer shroud may be used to replace the outer vacuum bag for enclosing the inner vacuum bag with both the shroud and the inner bag being sealed to the forming tool. The double-vacuum-bag assembly may be installed in an oven for heating the composite layup. Because double-vacuum-bag processing uses only vacuum pressure to consolidate and remove moisture, air, and/or volatiles from a composite layup, the compaction pressure on the composite layup may be less than the compaction pressure available in an autoclave. The dependency on vacuum pressure to consolidate the composite layup means that an effective inner bag chamber seal is required between the vacuum bag and the forming tool to ensure the quality of the cured composite article. Any leakage in the inner bag chamber seal between the inner and outer vacuum bags and the forming tool during consolidation and/or curing may reduce the amount of compaction pressure that can be applied to the composite layup during cure. In addition, leakage in the inner bag chamber seal may introduce air and porosity into the composite layup during curing.

As can be seen, there exists a need in the art for a method of ensuring the integrity and effectiveness of an inner bag chamber seal during curing of a composite layup in a double-vacuum-bag curing process.

SUMMARY

The above-noted needs associated with curing composite layups are specifically addressed and alleviated by the present disclosure which provides a method of curing a composite layup using a one-stage curing process. The method may include applying an inner bag vacuum pressure to an inner bag chamber and an outer vacuum pressure to an outer vacuum chamber. A vacuum bag covering a composite layup may be sealed to a forming tool with an inner bag chamber seal to form the inner bag chamber. The inner bag vacuum pressure may be no less than the outer vacuum pressure. The method may include increasing a temperature of the composite layup to an elevated temperature to initiate a temperature hold period. The method may additionally include venting the outer vacuum chamber to atmosphere to initiate an outer vacuum chamber venting period during the temperature hold period, and applying compaction pressure to the inner bag chamber seal during the outer vacuum chamber venting period. The method may further include re-applying the outer vacuum pressure to the outer vacuum chamber to terminate the outer vacuum chamber venting period. Evacuation of moisture, air, and/or volatiles from the composite layup may continue throughout the one-stage cure cycle.

Also disclosed is a method of manufacturing a composite article using a two-stage curing process which may comprise bagging a composite layup under a vacuum inner bag chamber sealed to a forming tool with an inner bag chamber seal to form an inner bag chamber. The method may additionally include sealing a rigid shroud to the forming tool such that the shroud covers the vacuum bag to form an outer vacuum chamber, and applying an inner bag vacuum pressure to the inner bag chamber and an outer vacuum pressure to the outer vacuum chamber. The inner bag vacuum pressure may be no less than the outer vacuum pressure. The method may further include increasing a temperature of the composite layup to an intermediate temperature to initiate an intermediate temperature hold period, and drawing moisture, air, and/or volatiles from the composite layup toward a bag vacuum port during the intermediate temperature hold period.

The method may also include venting the outer vacuum chamber to atmosphere to initiate an outer vacuum chamber venting period during the intermediate temperature hold period, and applying compaction pressure to the inner bag chamber seal during the outer vacuum chamber venting period. In addition, the method may include re-applying the outer vacuum pressure to the outer vacuum chamber to terminate the outer vacuum chamber venting period and continue removing moisture, air, and/or volatiles from the composite layup during the intermediate temperature hold period. The method may include re-venting the outer vacuum chamber to atmosphere while maintaining the inner bag vacuum pressure on the inner bag chamber, and applying compaction pressure of the vacuum bag against the composite layup in response to re-venting the outer vacuum chamber to atmosphere to consolidate the composite layup. The method may further include increasing a temperature of the composite layup from the intermediate temperature to a cure temperature to initiate a cure temperature hold period to cure the composite layup. Evacuation of moisture, air, and/or volatiles from the composite layup may continue throughout the two-stage cure cycle.

In a further embodiment, disclosed is a method of manufacturing a composite article comprising bagging a composite layup under a vacuum inner bag chamber sealed to a forming tool with an inner bag chamber seal to form an inner bag chamber defined as the space between the vacuum bag and the forming tool. The method may also include sealing a rigid shroud to the forming tool such that the shroud covers the vacuum bag and forms an outer vacuum chamber defined as the space between the vacuum bag and the shroud. An inner bag vacuum pressure may be applied to the inner bag chamber at a level no higher that an outer vacuum pressure applied to the outer vacuum chamber. The method may include heating the composite layup to an intermediate temperature to initiate an intermediate temperature hold period, and drawing moisture, air, and/or volatiles from the composite layup toward a bag vacuum port during the intermediate temperature hold period.

The method may further include venting the outer vacuum chamber to atmosphere to initiate an outer vacuum chamber venting period during the intermediate temperature hold period, while applying compaction pressure to the inner bag chamber seal during the outer vacuum chamber venting period. The outer vacuum chamber venting period may be terminated by re-applying the outer vacuum pressure to the outer vacuum chamber to continue or resume the removal of moisture, air, and/or volatiles from the composite layup during the intermediate temperature hold period. The method may additionally include re-venting the outer vacuum chamber to atmosphere at the termination of the intermediate temperature hold period while maintaining the inner bag vacuum pressure on the inner bag chamber, and applying compaction pressure onto the composite layup in response to re-venting the outer vacuum chamber to atmosphere to consolidate the composite layup. The temperature of the composite layup may be increased from the intermediate temperature to a cure temperature to initiate a cure temperature hold period. The method may include maintaining the compaction pressure on the composite layup during the cure temperature hold period until the composite layup is cured to form a cured composite article.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
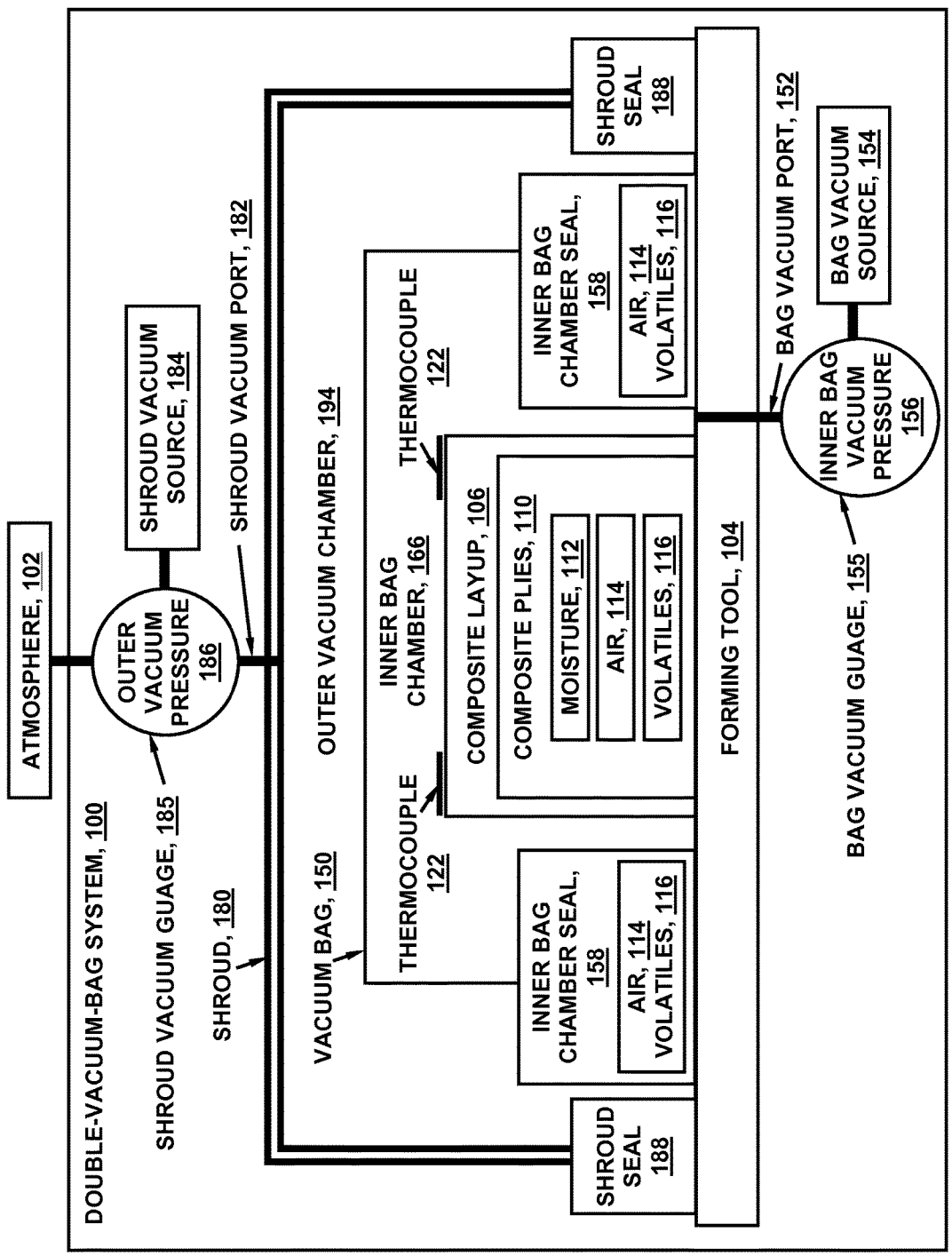
FIG. 1 is a block diagram of a double-vacuum-bag system for consolidating and curing of a composite layup.

Referring now to the drawings wherein the showings are for purposes of illustrating various embodiments of the present disclosure, shown in FIG. 1 is a block diagram of a double-vacuum-bag system 100 as may be implemented for consolidating and curing a composite layup 106 on a forming tool, layup mandrel, or cure tool, collectively referred to herein as a forming tool 104. The double-vacuum-bag system 100 may include a relatively flexible vacuum bag 150 that may be applied over a composite layup 106 comprised of fiber-reinforced polymer matrix material (not shown). One or more thermocouples 122 may be included with the double-vacuum-bag system 100 (e.g., mounted to the composite layup) to monitor the temperature of the composite layup 106 during consolidation and curing. The vacuum bag 150 may include a bag perimeter 160 (FIG. 2) that may be sealed to the forming tool 104 using an inner bag chamber seal 158 to form an inner bag chamber 166 which may be defined as the space between the vacuum bag 150 and the forming tool 104. The inner bag chamber 166 may be coupled to a bag vacuum source 154 via a bag vacuum port 152. The bag vacuum source 154 may be configured to apply an inner bag vacuum pressure 156 to the inner bag chamber 166.

Referring still to FIG. 1, the double-vacuum-bag system 100 may additionally include a relatively rigid shroud 180 that may cover the vacuum bag 150. The shroud 180 may include a shroud perimeter 190 (FIG. 2) that may be sealed to the forming tool 104 using a shroud seal 188 to form an outer vacuum chamber 194. The outer vacuum chamber 194 may be defined as the space bounded by the vacuum bag 150, the forming tool 104, and the rigid shroud 180. The outer vacuum chamber 194 may be coupled to a shroud vacuum source 184 via a shroud vacuum port 182. At the start of a cure cycle (e.g., t0 in FIGS. 4 and 7), the shroud vacuum source 184 may apply an outer vacuum pressure 186 to the outer vacuum chamber 194 in coordination with the application of an inner bag vacuum pressure 156 to the inner bag chamber 166 in a manner to draw entrapped moisture 112, air 114, and/or volatiles 116 from the composite layup 106 and out of the bag vacuum port 152. The composite layup 106 may be heated to an elevated temperature 212 during a temperature hold period 220 (e.g., t1-t5 in FIG. 4) to reduce the viscosity of resin (not shown) in the composite layup 106 and facilitate the evacuation of the moisture 112, air 114, and/or volatiles 116 through the reduced-viscosity resin (not shown).

Figure 2:
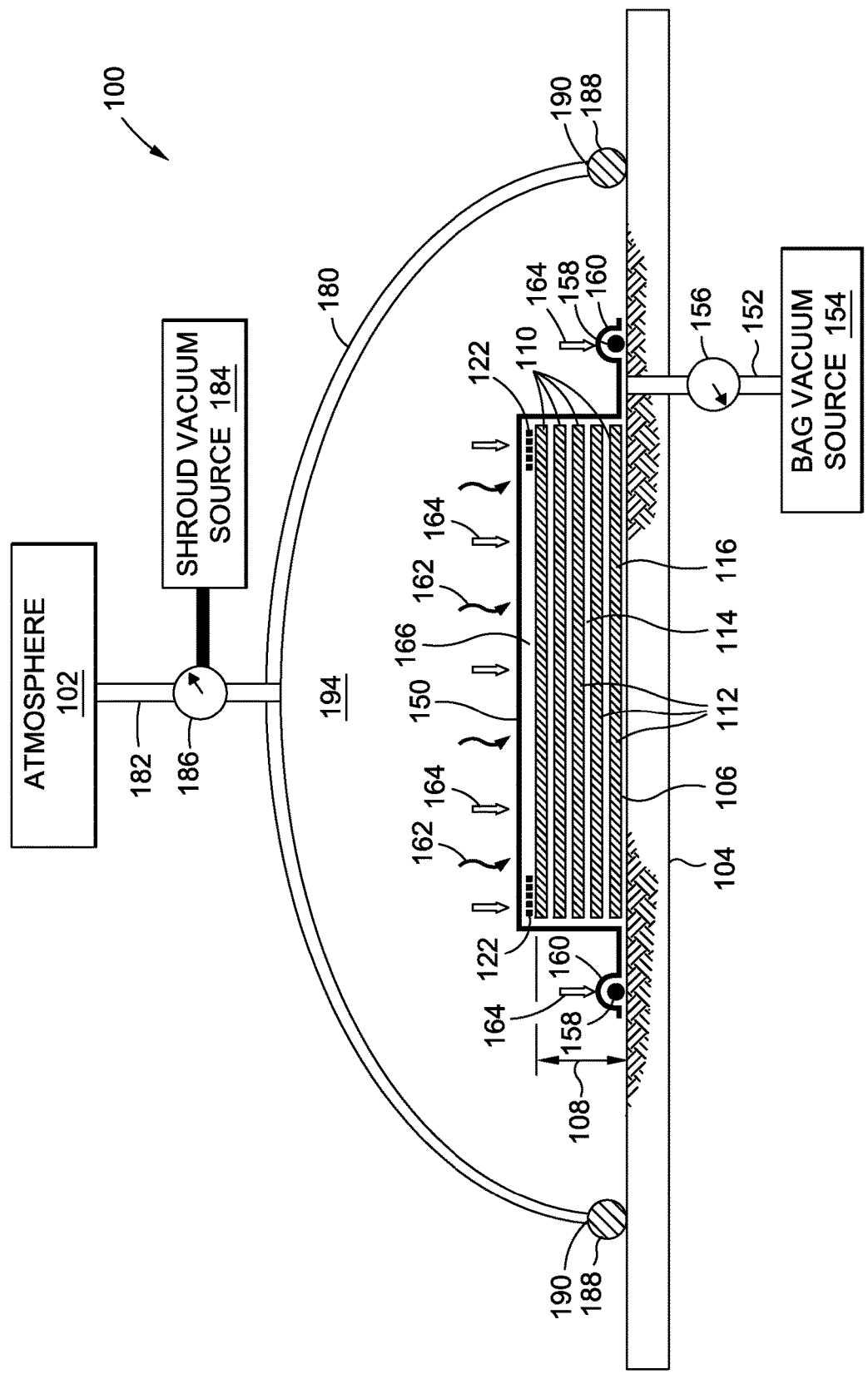
FIG. 2 is a side view illustration of an example of a double-vacuum-bag system.

As described in greater detail below, during the temperature hold period 220 (FIG. 4), the shroud 180 may be temporarily vented to the atmosphere 102 (e.g., at t2 in FIGS. 4 and 7) during an outer vacuum chamber venting period 226 (e.g., t2-t3 in FIGS. 4 and 7) prior to reapplying the outer vacuum pressure 186 (e.g., at t3 in FIGS. 4 and 7) to continue the drawing of moisture 112 (FIG. 1), air 114 (FIG. 1), and/or volatiles 116 (FIG. 1) from the composite layup 106 (FIG. 1). The temporary venting of the shroud 180 (FIG. 1) during the outer vacuum chamber venting period 226 (FIG. 4) advantageously results in the application of compaction pressure 164 (e.g., FIG. 2—atmospheric pressure) on the inner bag chamber seal 158 (FIG. 2) which may facilitate the removal of air 114 (FIG. 1) and volatiles 116 (FIG. 1) from the inner bag chamber seal 158 and permit the consolidation of the inner bag chamber seal 158 under the compaction pressure 164 (FIG. 2). The consolidation of the inner bag chamber seal 158 may improve the integrity and/or effectiveness of the inner bag chamber seal 158 which may allow for full vacuum (not shown) to be maintained within the inner bag chamber 166 and a corresponding increase in compaction pressure 164 (FIG. 2) on the composite layup 106 when the shroud 180 is again vented (e.g., at t4 in FIGS. 4 and 7) to the atmosphere 102 to consolidate and cure the composite layup 106 during the remainder of the cure cycle.

Figure 3:
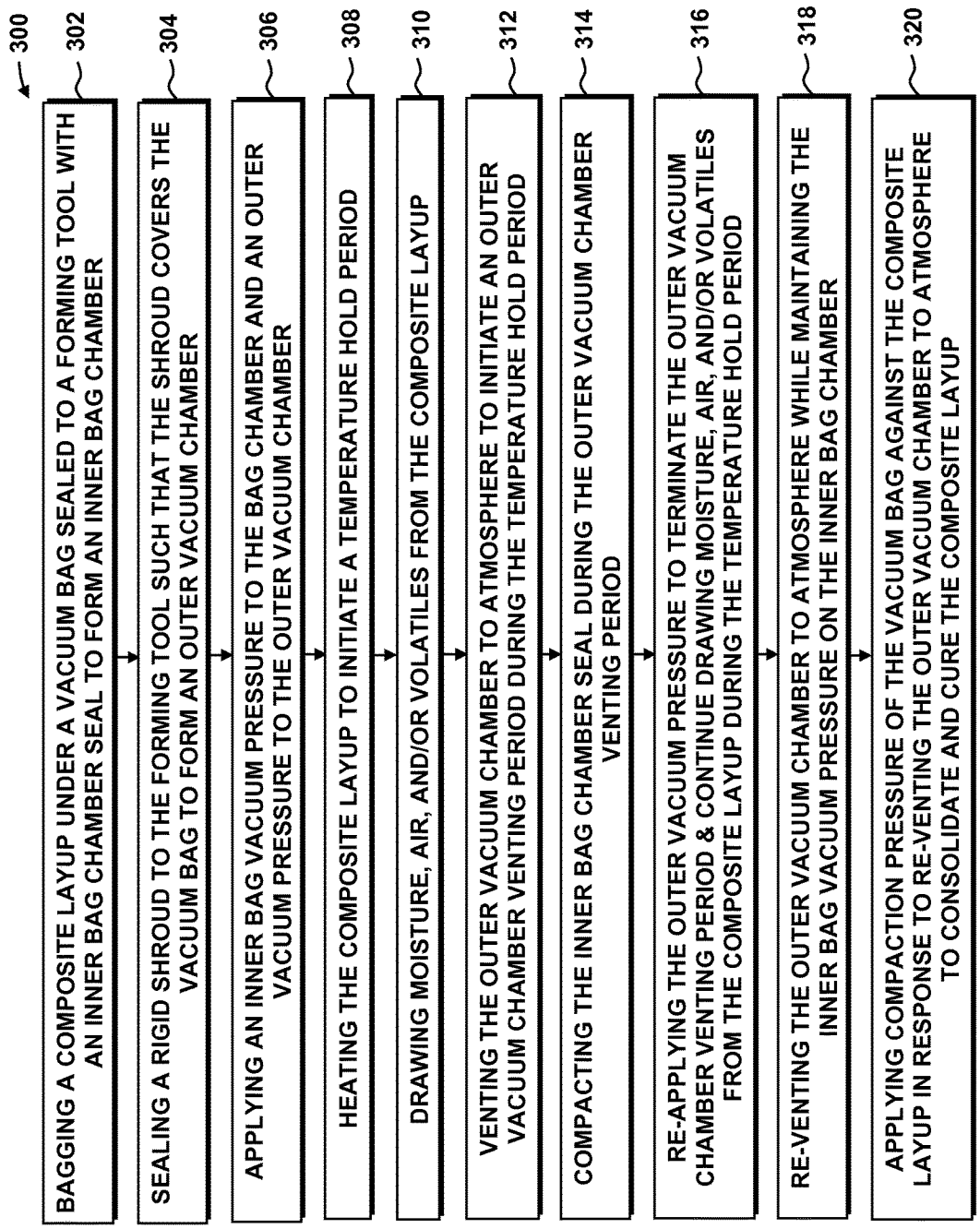
FIG. 3 is an illustration of a flowchart having one or more operations that may be included in a method of curing a composite layup in a one-stage process.
Figure 6:
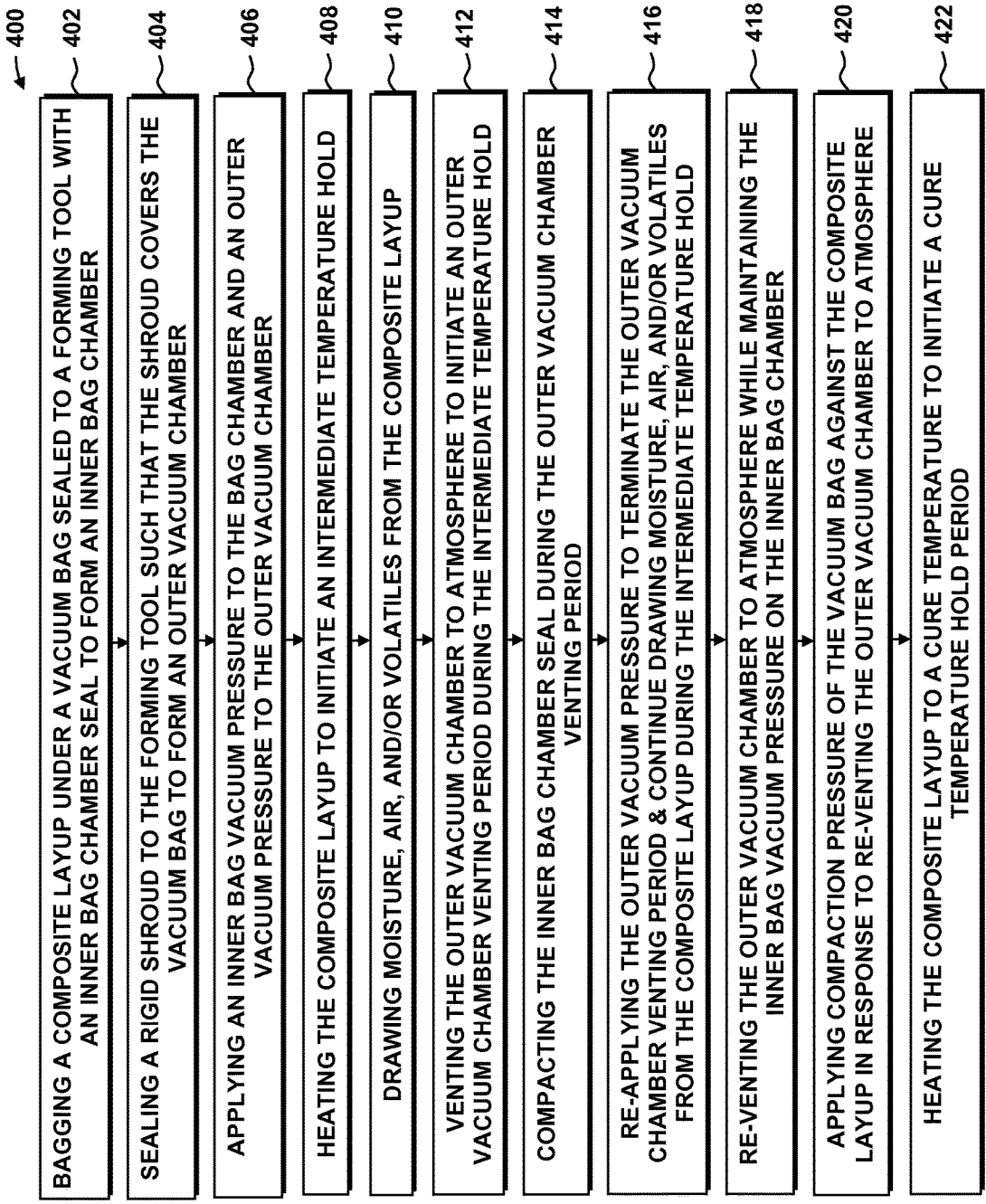
FIG. 6 is an illustration of a flowchart having one or more operations that may be included in a method of curing a composite layup in a two-stage process.

FIG. 2 shows an example of a double-vacuum-bag system 100 which may be implemented for curing a composite layup 106 using one or more of the examples of the presently-disclosed double-vacuum-bag curing method 300, 400 (FIGS. 3 and 6). As indicated above, the double-vacuum-bag system 100 includes a rigid shroud 180 which may be sealed to a forming tool 104 along a shroud perimeter 190 using a shroud seal 188. The shroud 180 may be provided in any one a variety of different sizes, shapes, and configurations capable of encompassing the vacuum-bag-covered composite layup 106 and forming an outer vacuum chamber 194 between the vacuum bag 150 and the shroud 180. The shroud 180 may be formed of any impermeable or low-permeable material or combination of materials including, but not limited to, metallic material and/or polymeric material (e.g., composite material) having sufficient stiffness and/or rigidity during curing of the composite layup 106 to at least resist atmospheric pressure (not shown) that may be applied to the shroud 180 as a result of an outer vacuum pressure 186 drawn on the outer vacuum chamber 194.

Referring still to FIG. 2, the shroud seal 188 may be a reusable seal (not shown) formed of rubber, silicone, or other elastomeric material capable of forming a substantially vacuum-tight seal between the shroud 180 and the forming tool 104. In one example, the shroud seal 188 may be adhesively-bonded and/or mechanically-coupled (e.g., permanently attached) to the forming tool 104 or to the shroud perimeter 190. Alternatively, the shroud seal 188 may be provided as a single-use seal (e.g., a non-reusable seal—not shown). For example, the shroud seal 188 may be provided as a curable synthetic rubber (not shown) such as non-reusable sealant tape (not shown) or other material which may be applied to the shroud perimeter 190 and/or to the forming tool 104 to seal the shroud 180 to the forming tool 104.

In FIG. 2, the shroud 180 may include at least one shroud vacuum port 182 through which an outer vacuum pressure 186 may be drawn on the outer vacuum chamber 194 by means of a shroud vacuum source 184. The shroud vacuum source 184 may be provided as a vacuum pump (not shown) or any other device capable of drawing an outer vacuum pressure 186 on the outer vacuum chamber 194. A shroud vacuum gauge 185 may be included to monitor the outer vacuum pressure 186 in the outer vacuum chamber 194.

In the example shown, the shroud vacuum port 182 may also provide the capability for venting the outer vacuum chamber 194 to the atmosphere 102. For example, the shroud vacuum port 182 may include a shroud valve (not shown) which may be opened to vent the outer vacuum chamber 194 to the atmosphere 102 and closed when the shroud vacuum source 184 is activated to allow an outer vacuum pressure 186 to be drawn on the outer vacuum chamber 194. In an alternative embodiment not shown, the shroud 180 may include a first shroud vacuum port (not shown) coupled to a shroud vacuum source 184 for drawing an outer vacuum pressure 186 on the outer vacuum chamber 194, and a second shroud vacuum port (not shown) for venting the outer vacuum chamber 194 to the atmosphere 102.

FIG. 2 shows a flexible vacuum bag 150 applied over a composite layup 106. The vacuum bag 150 may be formed of a flexible material capable of conforming to the shape or contour of the composite layup 106. In one example, the vacuum bag 150 may be provided as a non-reusable Nylon™ bag. However, the vacuum bag 150 may be formed of any one a variety of other types of elastomeric material (not shown) and which may be reusable or nonreusable. The vacuum bag 150 may be formed of a material that preferably provides low air-permeability or is non-permeable such as up to at least one atmosphere (e.g. 14.7 psi) of inner bag vacuum pressure 156. The vacuum bag 150 may be configured to maintain such low air-permeability or non-permeability at the processing temperatures associated with curing the composite layup 106.

In FIG. 2, the vacuum bag 150 may be sealed to the forming tool 104 along the bag perimeter 160 using an inner bag chamber seal 158. In some examples, the inner bag chamber seal 158 may be nonreusable. The inner bag chamber seal 158 may be formed of an elastomeric material which may be applied between the forming tool 104 and the vacuum bag 150. In one example, the inner bag chamber seal 158 may be provided as a curable rubber material. In an embodiment, the curable rubber may be a butyl rubber sealant (not shown) such as Tacky Tape™ commercially available from ITW Polymer Sealants of Irving, Tex. However, the inner bag chamber seal 158 may be formed of any material capable of forming a substantially vacuum-tight seal with the forming tool 104 and maintaining such vacuum-tight seal at the temperatures associated with consolidating and curing the composite layup 106.

In FIG. 2, the double-vacuum-bag system 100 may include a bag vacuum port 152 through which an inner bag vacuum pressure 156 may be drawn on the inner bag chamber 166 by means of a bag vacuum source 154. In the example shown, a bag vacuum port 152 may extend through the forming tool 104 to fluidly couple the inner bag chamber 166 to the bag vacuum source 154. However, the bag vacuum port 152 may be mounted at any location that provides the capability for the bag vacuum source 154 to draw an inner bag vacuum pressure 156 on the inner bag chamber 166. The bag vacuum source 154 may be provided as a vacuum pump (not shown) or other device capable of drawing an inner bag vacuum pressure 156 on the vacuum bag 150. A bag vacuum gauge 155 may be fluidly coupled to the inner bag chamber 166 (e.g., via the bag vacuum port 152) to provide a means for monitoring the inner bag vacuum pressure 156 within the inner bag chamber 166.

Referring still to FIG. 2, the composite layup 106 may be formed of one or more composite plies 110 of fiber-reinforced polymer matrix material which may be laid up on the forming tool 104. In one example, the composite plies 110 may be prepreg plies (not shown) comprised of reinforcing fibers (not shown) such as carbon fibers (not shown) pre-impregnated with resin (not shown) such as epoxy resin (not shown). However, the presently-disclosed method may be implemented for consolidating and curing a composite layup 106 formed of any one of a variety of different fiber-reinforced polymer matrix material systems, and is not limited to curing a composite layup 106 formed of carbon-epoxy prepreg plies. For example, the composite layup 106 may be comprised of dry fibrous material (not shown) such as a dry fabric preform (not shown) that may be laid up on the forming tool 104 and infused with resin such as in a wet layup process (not shown) or other resin infusion process (not shown) prior to consolidating and and/or curing the composite layup 106 using one or more of the presently-disclosed methods. The double-vacuum-bag system 100 may include one or more additional layers of material positioned between the vacuum bag 150 and the composite layup 106 to facilitate the consolidation and/or curing of the composite layup 106. For example, a breather layer (not shown), a bleeder layer (not shown), a release film (not shown), one or more layers of peel ply (not shown), a caul plate (not shown) and/or other materials (not shown) may be included with or applied over the composite layup 106 to facilitate the consolidation and curing of the composite layup 106.

In FIG. 2, the double-vacuum-bag system 100 may include one or more temperature-sensing devices (not shown) or other means for monitoring the temperature of the composite layup 106 at different locations. In the example shown, such temperature-sensing devices may be provided as thermocouples 122 which may be mounted at different locations on the composite layup 106 for measuring the temperature of the composite layup 106 during the presently-disclosed methods. Although not shown, components (not shown) of the double-vacuum-bag system 100 other than the composite layup 106 may include one or more thermocouples 122. For example, the double-vacuum-bag system 100 may include thermocouples (not shown) for measuring the temperature of the air (not shown) within the inner bag chamber 166, and/or thermocouples (not shown) may be provided at other locations within the double-vacuum-bag system 100 to provide a means for monitoring the temperature of such other components that make up the double-vacuum-bag system 100. Although the present disclosure illustrates thermocouples 122 installed on the composite layup 106, other means (not shown) may be implemented for monitoring the temperature of the composite layup 106 and/or other components of the double-vacuum-bag system 100.

In an aspect of the presently-disclosed methods 300, 400 (FIGS. 4 and 7), thermocouples 122 may provide a means for determining the point at which to initiate a temporary outer vacuum chamber venting period 226 (e.g., t1-t2 in FIGS. 4 and 7) during the curing cycle. In one example described below, such outer vacuum chamber venting period 226 may be initiated once substantially all locations of the composite layup 106 are within a predetermined range (e.g., within 10° F.) of an elevated temperature 212 (FIG. 4) of the composite layup 106. During the outer vacuum chamber venting period 226, the outer vacuum chamber 194 may be temporarily vented to the atmosphere 102 to cause compaction pressure 164 (e.g., atmospheric pressure) to be applied to the inner bag chamber seal 158 to consolidate the inner bag chamber seal 158. As described below, consolidation of the inner bag chamber seal 158 during the outer vacuum chamber venting period 226 may improve the effectiveness of the inner bag chamber seal 158 in maintaining a vacuum-type seal between the vacuum bag 150 and the forming tool 104 during the remainder of the cure cycle.

Figure 4:
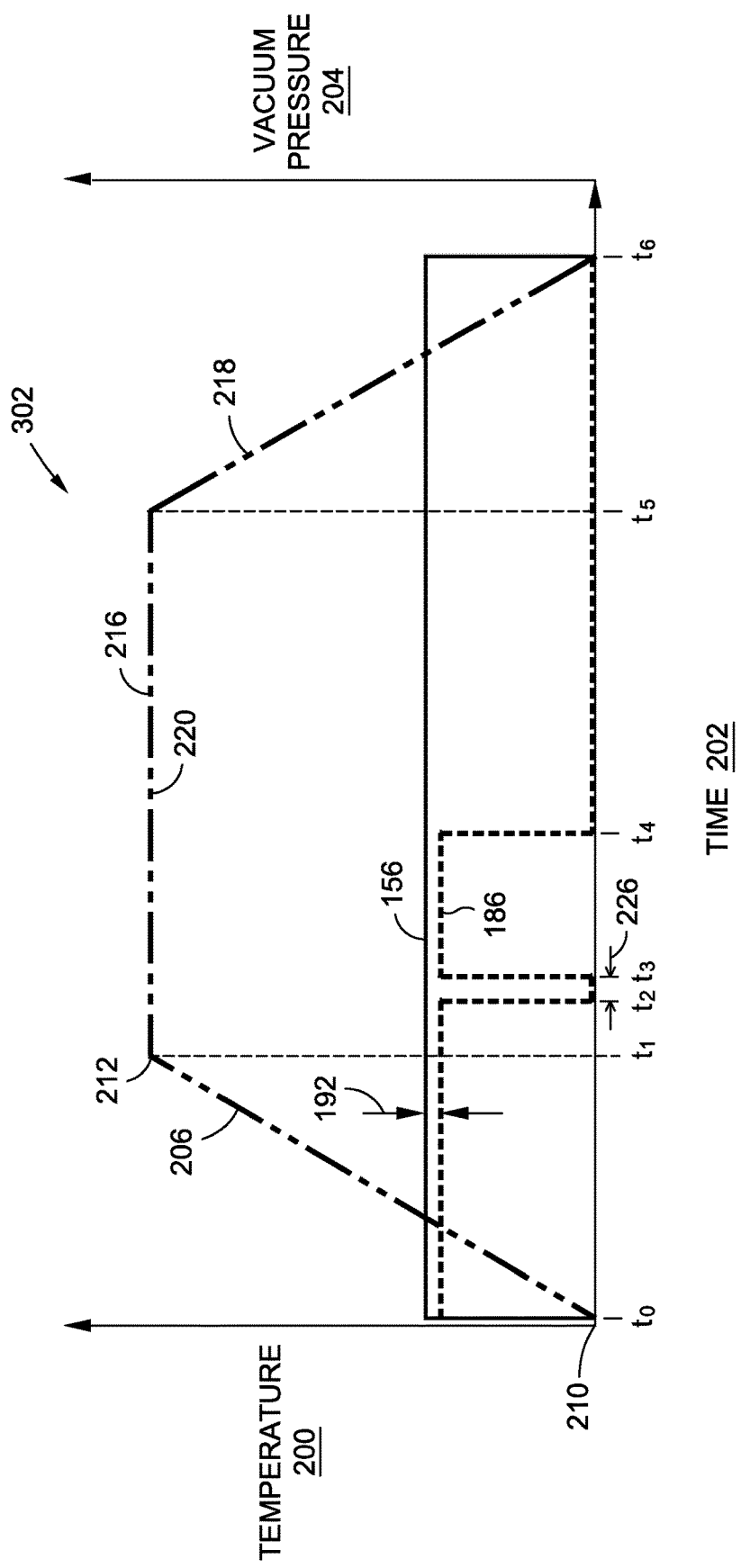
FIG. 4 is an illustration of a graph of temperature, time, and vacuum pressure in an example of a one-stage process of curing a composite layup.
Figure 7:
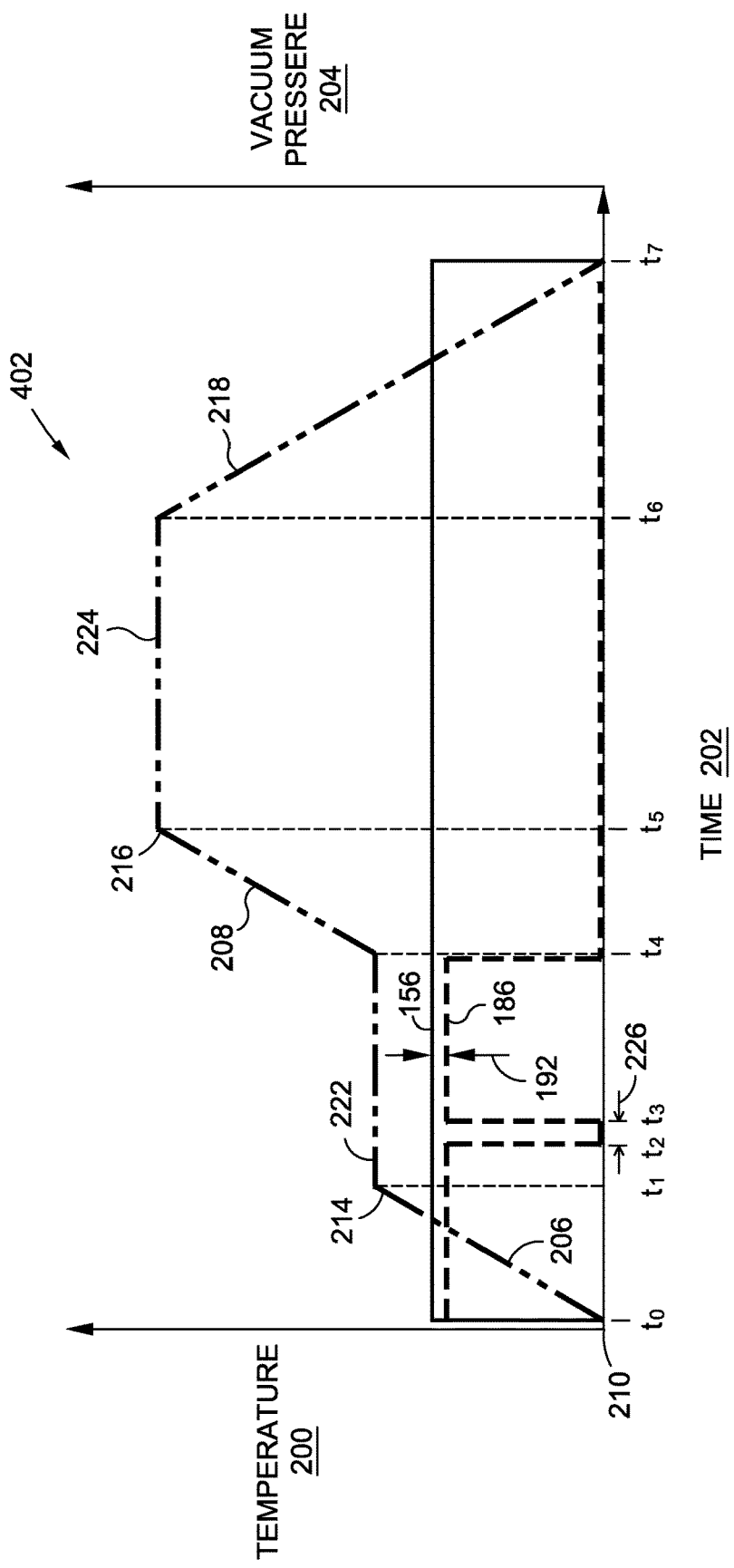
FIG. 7 is an illustration of a graph of temperature, time, and vacuum pressure in an example of a two-stage process of curing a composite layup.

Although not shown in FIG. 2, the double-vacuum-bag system 100 may include a heat source (not shown) for heating the composite layup 106 to an elevated temperature 212 (FIGS. 4 and 7). The elevated temperature 212 may be the temperature at which moisture 112, air 114, and/or volatiles 116 may be evacuated from the composite layup 106 and/or the elevated temperature 212 (FIGS. 4 and 7) may be the temperature for curing the resin (not shown) in the composite layup 106. In one example, the double-vacuum-bag system 100 may be installed in an oven (not shown) to heat the composite layup 106 from an ambient temperature 210 (FIGS. 4 and 7) to an elevated temperature 212 (FIGS. 4 and 7) such as an intermediate temperature 214 (FIG. 7) and/or a cure temperature 216 (FIG. 7). Alternatively or additionally, the composite layup 106 may be heated using a local heating device (not shown) such as heating elements (not shown) to heat the forming tool 104, or the composite layup 106 may be heated by radiation heating (not shown), forced-hot-air heating (not shown), or any one a variety of other heating systems or devices (not shown).

FIG. 3 is an illustration of a flowchart having one or more operations that may be included in a method 300 of curing a composite layup 106 in a one-stage process 302. As mentioned above and described in greater detail below, the presently-disclosed double-vacuum-bag process may include at least one outer vacuum chamber venting period 226 (e.g., t2-t3 in FIGS. 4 and 7) during which the shroud 180 (FIG. 1) may be temporarily vented to the atmosphere 102 (FIG. 1) prior to reapplying the outer vacuum pressure 186 (e.g., at t3 in FIGS. 4 and 7) to continue drawing moisture 112 (FIG. 1), air 114 (FIG. 1), and/or volatiles 116 (FIG. 1) from the composite layup 106 (FIG. 1). During the outer vacuum chamber venting period 226, compaction pressure 164 (e.g., FIG. 2—atmospheric pressure) may be applied to the inner bag chamber seal 158 (FIG. 1) to facilitate the removal of air 114 (FIG. 1) and volatiles 116 (FIG. 1) from the inner bag chamber seal 158 and allow for consolidation of the inner bag chamber seal 158 which may improve the effectiveness of the inner bag chamber seal 158 in establishing and/or maintaining a substantially vacuum-tight seal between the vacuum bag 150 and the forming tool 104 (FIG. 1).

The improvement in the effectiveness of the inner bag chamber seal 158 (FIG. 1) may decrease the amount of air that may be introduced into the composite layup 106 (FIG. 13) during cure and may allow for an increase in compaction pressure 164 (e.g., full atmospheric pressure) on the composite layup 106 (FIG. 1) when the shroud 180 (FIG. 1) is again vented (e.g., at t4 in FIGS. 4 and 7) to the atmosphere 102 (FIG. 1) and the inner bag vacuum pressure 156 (FIG. 1) is maintained on the inner bag chamber 166 (FIG. 1). The increase in compaction pressure 164 (FIG. 2) on the composite layup 106 (FIG. 2) as a result of the consolidation of the inner bag chamber seal 158 during the outer vacuum chamber venting period 226 (e.g., t2-t3 in FIGS. 4 and 7) may result in an increase in the amount of moisture 112, air 114, and/or volatiles 116 that may be evacuated from the composite layup 106 during the cure cycle. The decrease in air leaks in the inner bag chamber seal 158 and the increase in the evacuation of moisture 112, air 114, and/volatiles 116 from the composite layup 106 may result in a decrease or an elimination of voids in the cured composite article 118 (FIG. 5), with a corresponding improvement in the mechanical properties of the cured composite article 118 such as an increase in specific strength and/or specific stiffness.

An example of the method 300 of FIG. 3 is now described with reference to FIG. 4 which illustrates the relationship between temperature 200, time 202, and vacuum pressure 204 during a one-stage process 302 of curing a composite layup 106 (FIG. 1). The method 300 may include placing a composite layup 106 on a forming tool 104. For example, the method 300 may include laying up one or more prepreg composite plies 110 on the forming tool 104 prior to consolidating and curing the composite layup 106 using the presently-disclosed method. Alternatively, the method 300 may include laying up one or more dry fiber plies (not shown) to form a composite layup 106 followed by infusing the composite layup 106 with resin prior to consolidating and curing using the presently-disclosed method.

Step 302 of the method 300 of FIG. 3 may include bagging the composite layup 106 (FIG. 1) under a vacuum bag 150 (FIG. 1). As indicated above, the step of bagging the composite layup 106 may include applying additional layers such as a breather layer (not shown), a separator film (not shown), a caul plate (not shown), over the composite layup 106. The vacuum bag 150 may be sealed to the forming tool 104 with an inner bag chamber seal 158 (FIG. 1) which may be located along a bag perimeter 160 (FIG. 2) of the vacuum bag 150. The vacuum bag 150 may form an inner bag chamber 166 (FIG. 1) which may be defined as the space between the vacuum bag 150 and the forming tool 104 and which may contain the composite layup 106 (FIG. 1) and other layers. The vacuum bag 150 may be a nonreusable or single-use bag (e.g., a Nylon™ bag) or the vacuum bag 150 may be reusable, as indicated above. The inner bag chamber seal 158 (FIG. 1) may initially be provided as an uncured sealant composition that cures over time and/or at an elevated temperature 212 (FIGS. 4 and 7). In one example, the uncured sealant may be a butyl rubber sealant, commercially available as Tacky Tape™ as mentioned above.

Step 304 of the method 300 of FIG. 3 may include sealing a shroud 180 (FIG. 1) to the forming tool 104 (FIG. 1) using a shroud seal 188 (FIG. 1). As indicated above, the shroud 180 may be formed of a material capable of withstanding atmospheric pressure during the consolidation and curing of the composite layup 106 (FIG. 1). The shroud seal 188 may be provided as an elastomeric material which may be removably or fixedly secured to the shroud perimeter 190 (FIG. 2) and/or to the forming tool 104 (FIG. 2). In one example, the shroud seal 188 may be a reusable seal (not shown) which may be attached to the shroud perimeter 190 and adhesively bonded to the forming tool 104. The shroud 180 may be sized and configured such that when the shroud 180 is sealed to the forming tool 104, the shroud perimeter 190 is located outside of the bag perimeter 160 of the vacuum bag 150. The shroud 180 may cover the vacuum bag 150 to form an outer vacuum chamber 194 (FIG. 2) defined as the space between the vacuum bag 150 and the shroud 180.

Step 306 of the method 300 of FIG. 3 may include applying an inner bag vacuum pressure 156 (FIG. 4) to the inner bag chamber 166 (FIG. 1) and an outer vacuum pressure 186 (FIG. 4) to the outer vacuum chamber 194 (FIG. 1) as shown at time t0 in FIG. 4 wherein the outer vacuum pressure 186 is shown as a dashed line and the inner bag vacuum pressure 156 is shown as a solid line. The outer vacuum pressure 186 (FIG. 4) may be applied by activating the shroud vacuum source 184 (FIG. 1) to apply the outer vacuum pressure 186 on the inner bag chamber 166 (FIG. 1) through the shroud vacuum port 182 (FIG. 1). Likewise, the inner bag vacuum pressure 156 (FIG. 4) may be applied by activating the bag vacuum source 154 (FIG. 1) and applying the inner bag vacuum pressure 156 (FIG. 4) on the inner bag chamber 166 (FIG. 1) through the bag vacuum port 152 (FIG. 1).

The step of applying the inner bag vacuum pressure 156 (FIG. 4) and the outer vacuum pressure 186 (FIG. 4) may include applying the inner bag vacuum pressure 156 on the inner bag chamber 166 (FIG. 1) at a level that is no less than the outer vacuum pressure 186 applied to the outer vacuum chamber 194 (FIG. 1). Applying the inner bag vacuum pressure 156 at a level that is no less than the outer vacuum pressure 186 may avoid the vacuum pressure in the outer vacuum chamber pulling the vacuum bag 150 away from the composite layup 106 (FIG. 1) and/or may avoid compromising the integrity of the inner bag chamber seal 158. In some examples, the step of applying the inner bag vacuum pressure 156 and the outer vacuum pressure 186 may include applying the inner bag vacuum pressure 156 at a level equal to the outer vacuum pressure 186 to avoid placing any compaction pressure 164 (FIG. 2) on the composite layup 106 which may otherwise restrict the evacuation of moisture 112, air 114, and/or volatiles 116 out of the composite layup 106. However, in other examples, the inner bag vacuum pressure 156 applied to the inner bag chamber 166 may be higher than the outer vacuum pressure 186 applied to the outer vacuum chamber 194 by less than 2 in. Hg to provide a slight amount of compaction pressure 164 (FIG. 2) on the composite layup 106 to prevent movement of the composite layup 106 and/or the inner bag chamber seal 158 relative to the forming tool 104 during the outgassing of moisture 112, air 114, and/or volatiles 116 from the composite layup 106 (FIG. 1). In one example, the inner bag vacuum pressure 156 may be between 0.5-1.5 in. Hg higher (e.g., the pressure differential 192 in FIG. 4) than the outer vacuum pressure 186.

Step 308 of the method 300 of FIG. 3 may include increasing the temperature 200 (FIG. 4) of the composite layup 106 (FIG. 1) to an elevated temperature 212 (FIG. 4). As indicated above, the temperature of the composite layup 106 may be increased by heating the composite layup 106 using any one a variety of different heating means including, but not limited to, an oven, resistance heating elements, or other heating devices. FIG. 4 illustrates the increase in temperature of the composite layup 106 during a first temperature ramp 206 (FIG. 4) from ambient temperature 210 (e.g., room temperature 68-72° F.) to an elevated temperature 212 which may be determined at least in part on the material system of the composite layup 106. For example, the elevated temperature 212 (FIG. 4) for an epoxy resin may be in the range of approximately 150-170° F. The heating of the composite layup 106 (FIG. 1) may be initiated simultaneous with or after (e.g., within several minutes of) the application of the inner bag vacuum pressure 156 (FIG. 4) and the outer vacuum pressure 186 (FIG. 4) on the respective inner bag chamber 166 (FIG. 1) and outer vacuum chamber 194 (FIG. 1).

The heating of the composite layup 106 (FIG. 1) to the elevated temperature 212 (FIG. 4) may be performed continuously at a substantially constant rate from t0-t1 in FIG. 4. Depending upon the material system of the composite layup 106 (FIG. 1), the amount of time (e.g., from t0-t1 in FIG. 4) required to perform the temperature ramp 206 (FIG. 4) of the composite layup 106 from ambient temperature 210 (FIG. 4) to the elevated temperature 212 (FIG. 4) may be in the range of approximately 30-90 minutes. The method 300 of FIG. 3 may include maintaining the composite layup 106 (FIG. 1) at the elevated temperature 212 (FIG. 4) during a temperature hold period 220 as shown in FIG. 4. The heating of the composite layup 106 to the elevated temperature 212 may initiate and/or facilitate the cross-linking polymerization of the resin (not shown) to promote the curing of the resin.

Step 310 of the method 300 of FIG. 3 may include drawing moisture 112 (FIG. 1), air 114 (FIG. 1), and/or volatiles 116 (FIG. 1) from the composite layup 106 (FIG. 1) toward the bag vacuum port 152 (FIG. 1) while maintaining the composite layup 106 at the elevated temperature 212 (FIG. 4) and maintaining the inner bag vacuum pressure 156 (FIG. 4) on the inner bag chamber 166 (FIG. 1) and the outer vacuum pressure 186 (FIG. 4) on the outer vacuum chamber 194 (FIG. 1). The elevated temperature 212 of the composite layup 106 may cause the moisture 112 (FIG. 1), air 114 (FIG. 1) and volatiles 116 (FIG. 1) within the composite layup 106 to expand and evacuate through the reduced-viscosity resin (not shown) with little or no resistance due to the negligible (e.g., less than 1 psi) or nonexistent net compaction pressure 164 (FIG. 2) on the composite layup 106 due to the minimal pressure differential 192 (FIG. 4) between the inner bag vacuum pressure 156 (FIG. 4) and the outer vacuum pressure 186 (FIG. 4). Depending upon the composite layup 106 (FIG. 1) material system, the duration of the temperature hold period 220 (e.g., from t1-t4 in FIG. 4) may be in the range of approximately 30 minutes to 2 hours or more. By holding the composite layup 106 at the elevated temperature 212 (FIG. 4), the resin (not shown) may be maintained at a relatively low viscosity level which may facilitate the evacuation of moisture 112, air 114, and/or volatiles 116 from the interior (not shown) of the composite layup 106 (FIG. 1) and out of the bag vacuum port 152 (FIG. 1) under the inner bag vacuum pressure 156 (FIG. 1) applied by the bag vacuum source 154 (FIG. 1).

Step 312 of the method 300 of FIG. 3 may include venting the outer vacuum chamber 180 (FIG. 1) to the atmosphere 102 (FIG. 1) to initiate an outer vacuum chamber venting period 226 starting at t2 in FIG. 4. Although FIG. 4 illustrates a single outer vacuum chamber venting period 226, the methods 300, 400 (FIGS. 3 and 6) may include any number of outer vacuum chamber venting periods 226 for outgassing the inner bag chamber seal 158 to improve the effectiveness of the inner bag chamber seal 158. The shroud 180 may be vented to the atmosphere 102 by opening a shroud vacuum port 182 (FIG. 1). The shroud vacuum source 184 (FIG. 1—e.g., vacuum pump) may also be deactivated to halt the application of outer vacuum pressure 186 (FIG. 4) to the outer vacuum chamber 194 (FIG. 1). The outer vacuum chamber venting period 226 may be initiated at a point no earlier than when the composite layup 106 (FIG. 1) reaches the elevated temperature 212 (FIG. 1). In an embodiment, the temperature of the composite layup 106 may be sensed at different locations using a plurality of part thermocouples 122 mounted at different locations on the composite layup 106. Once all of the part thermocouples 122 on the composite layup 106 substantially reach the elevated temperature 212, the shroud 180 may be vented to the atmosphere 102 (FIG. 1) while maintaining the inner bag vacuum pressure 156 (FIG. 4) on the inner bag chamber 166 (FIG. 1). For example, the outer vacuum chamber venting period 226 (t1-t2 in FIG. 4) may be initiated no earlier than when all locations of the composite layup 106 are within 10° F. of the elevated temperature 212.

Step 314 of the method 300 of FIG. 3 may include applying compaction pressure 164 (FIG. 2—e.g., atmospheric pressure) to the inner bag chamber seal 158 (FIG. 1) and the composite layup 106 (FIG. 1) during the outer vacuum chamber venting period 226 (e.g., from t2-t3 of FIG. 4) as a result of venting the outer vacuum chamber 194 (FIG. 1) to the atmosphere 102 (FIG. 1). The application of compaction pressure 164 (FIG. 2) may result in drawing and/or forcing air 114 (FIG. 1) and volatiles 116 (FIG. 1) from the uncured inner bag chamber seal 158, and consolidation of the inner bag chamber seal 158 which may improve the sealing capability of the inner bag chamber seal 158. Such air 114 and/or volatiles 116 may be pre-existing within the inner bag chamber seal 158 and/or the air 114 and/or volatiles 116 may be generated by, expanded within, or produced by the inner bag chamber seal 158 as a result of the application of the outer vacuum pressure 186 (FIG. 4) to the outer vacuum chamber 194 (FIG. 1), and/or as a result of heating of the uncured inner bag chamber seal 158 during the heating of the composite layup 106. The air 114 and volatiles 116 from the inner bag chamber seal 158 may be drawn toward the bag vacuum port 152 (FIG. 1) and/or the shroud vacuum port 182 (FIG. 1) during the outer vacuum chamber venting period 226 (FIG. 4) and may be discharged into the atmosphere 102 (FIG. 1).

Figure 5:
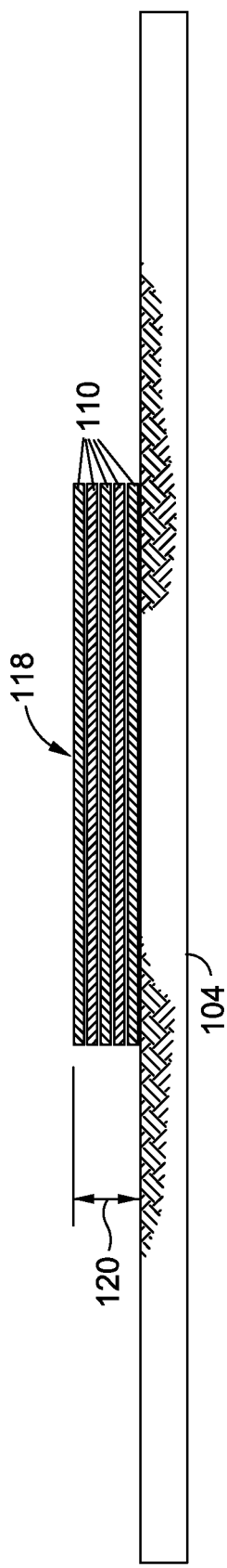
FIG. 5 is a side view illustration of a cured composite article having a cured article thickness.

The method 300 of FIG. 3 may include maintaining the composite layup 106 (FIG. 1) approximately at the elevated temperature 212 (FIG. 4—e.g., within 10° F.) during the outer vacuum chamber venting period 226 (FIG. 4) to facilitate outgassing of air 114 (FIG. 1) and volatiles 116 (FIG. 1) from the inner bag chamber seal 158 and to facilitate consolidation of the inner bag chamber seal 158 (FIG. 1) as may be enabled by the outgassing of the inner bag chamber seal 158. The duration of the outer vacuum chamber venting period 226 (FIG. 4) may be empirically-determined (e.g., in a laboratory) prior to initiating the double-vacuum-bag curing process of the composite layup 106 and may be based at least in part on the material system of the composite layup 106 and/or the composition of the inner bag chamber seal 158. The outer vacuum chamber venting period 226 may be long enough to allow for outgassing of a majority of the air 114 (FIG. 1) and volatiles 116 (FIG. 1) from the inner bag chamber seal 158 (FIG. 1), and short enough to prevent over-consolidation of the composite layup 106 (FIG. 1) prior to final cure of the composite layup 106 (FIG. 1). For example, the method may include continuing the outer vacuum chamber venting period 226 (FIG. 4) until a rate of outgassing of air 114 and/or volatiles 116 from the inner bag chamber seal 158 reduces to a level that is less than 50% of a maximum outgassing rate of the inner bag chamber seal 158. Such maximum outgassing rate of the inner bag chamber seal 158 may be empirically-determined in a laboratory setting prior to initiating the double-vacuum-bag process of the presently-disclosed method 300. Alternatively or additionally, the outer vacuum chamber venting period 226 may be of a duration such that the original layup thickness 108 (FIG. 2) of the composite layup 106 (e.g., prior to t0 in FIG. 4) is reduced (e.g., consolidated) to a level of no more than 20% of a total amount of consolidation of the cured composite article 118 as represented by the article thickness 120 (FIG. 5) of the cured composite article 118 (FIG. 5). The total amount of consolidation of the cured composite article 118 may be empirically determined by testing one or more composite layup specimens (not shown) formed of the same material system (e.g., the same resin composition and fiber composition) and having the same ply stacking sequence (not shown) as the composite layup 106, and subjecting such layup specimens to the same pressures and temperatures that are used in curing the composite layup 106.

In still other examples, the inner bag chamber seal 158 (FIG. 1) may be formed of a composition (not shown) that foams (not shown) at least when the inner bag chamber seal 158 is exposed to the outer vacuum pressure 186 (FIG. 1) and/or when the inner bag chamber seal 158 is heated such as up to the elevated temperature 212 (FIG. 4). The foaming (not shown) of the inner bag chamber seal 158 may represent the expansion of air 114 (FIG. 1) and/or volatiles 116 (FIG.

1) in the inner bag chamber seal 158 and the release or emittance of such air 114 and/or the volatiles 116 from the inner bag chamber seal 158. The outer vacuum chamber venting period 226 (FIG. 4) may be of a duration that allows for the removal of air 114 and volatiles 114 from the inner bag chamber seal 158 as the inner bag chamber seal 158 is consolidated and may continue until the inner bag chamber seal 158 stops foaming, or at least until the foaming of the inner bag chamber seal 158 is reduced to a level of less than 50% of the maximum amount of foaming of the inner bag chamber seal 158. The maximum foaming of the inner bag chamber seal 158 may be pre-determined (e.g., in a laboratory) and may be represented as the maximum volumetric outgassing rate (not shown) of air 114 and/or volatiles 116 from the inner bag chamber seal 158 at the vacuum pressures and/or at the elevated temperature(s) 212 to which the inner bag chamber seal 158 may be exposed during consolidation and curing of the composite layup 106. The volumetric outgassing rate of the inner bag chamber seal 158 may be described as the volume of air 114 and/or volatiles 116 emitted per unit time (e.g., per minute) by the inner bag chamber seal 158. Alternatively or additionally, the outer vacuum chamber venting period 226 may be continued until the inner bag chamber seal 158 stops foaming as may be determined by visual observation of the inner bag chamber seal 158 and/or by measuring the outgassing rate of the inner bag chamber seal 158 with one or more outgassing rate sensors (not shown).

In some examples, the outer vacuum chamber venting period 226 (e.g., t2-t3 in FIG. 4) may be less than 10 minutes in duration. For example, an outer vacuum chamber venting period 226 of from 1-5 minutes in duration may allow for evacuation of air 114 (FIG. 1) and/or volatiles 116 (FIG. 1) from the inner bag chamber seal 158 (FIG. 1) and simultaneous consolidation of the inner bag chamber seal 158 due to the application of compaction pressure 164 (FIG. 2) during the outgassing of air 114 and/or volatiles 116 during the outer vacuum chamber venting period 226 (FIG. 4). As indicated above, the duration of the outer vacuum chamber venting period 226 may be selected to provide a balance between allowing enough time for air 114 and/or volatiles 116 to evacuate from the inner bag chamber seal 158 and limiting the duration of the outer vacuum chamber venting period 226 to prevent over-consolidation of the composite layup 106 (FIG. 1). Over-consolidation of the composite layup 106 during the outer vacuum chamber venting period 226 may reduce the ability to evacuate moisture 112, air 114 and/or volatiles 116 from the composite layup 106 after the termination of the outer vacuum chamber venting period 226 and during the remainder of the composite layup 106 curing process.

Step 316 of the method 300 of FIG. 3 may include terminating the outer vacuum chamber venting period 226 (e.g., at t3 in FIG. 4) by halting the venting of the outer vacuum chamber 194 (FIG. 1) to the atmosphere 102 (FIG. 1) and re-applying the outer vacuum pressure 186 (FIG. 4) to the outer vacuum chamber 194 to continue removing moisture 112 (FIG. 1), air 114 (FIG. 1), and/or volatiles 116 (FIG. 1) from the composite layup 106 (FIG. 1) during the temperature hold period 220 (FIG. 4). The outer vacuum pressure 186 may be returned to substantially the same level as prior to the outer vacuum chamber venting period 226. The inner bag chamber 166 may be maintained at substantially the same inner bag vacuum pressure 156 as the vacuum pressure prior to and/or during the outer vacuum chamber venting period 226. In this regard, the inner bag vacuum pressure 156 applied to the inner bag chamber 166 may be no less than the outer vacuum pressure 186. For example, as indicated above, the inner bag vacuum pressure 156 (FIG. 4) may be between 0.5-1.5 in. Hg higher (e.g., the pressure differential 192 in FIG. 4) than the outer vacuum pressure 186 (FIG. 4) to minimize compaction pressure 164 (FIG. 2) on the composite layup 106 (FIG. 1) and thereby promote the evacuation or outgassing of moisture 112, air 114, and/or volatiles 116 from the composite layup 106. Depending upon the material system and geometry (e.g., layup thickness 108—not shown) of the composite layup 106, the outer vacuum pressure 186 and the inner bag vacuum pressure 156 may be maintained for a predetermined time period to allow evacuation of the moisture 112, air 114, and/or volatiles 116. In one example, the outer vacuum pressure 186 and the inner bag vacuum pressure 156 may be maintained for 30-180 minutes to allow for outgassing of the composite layup 106 during the time period from t0-t4 in FIG. 4.

Step 318 of the method 300 of FIG. 3 may include re-venting the outer vacuum chamber 194 to the atmosphere 102 (e.g., at t4 in FIG. 4) during the temperature hold period 220 (FIG. 4). The outer vacuum chamber 194 (FIG. 1) may be vented to the atmosphere 102 (FIG. 1) by opening the shroud vacuum port 182 (FIG. 1) and deactivating the shroud vacuum source 184 (FIG. 1) to halt the application of outer vacuum pressure 186 (FIG. 4) on the outer vacuum chamber 194 (FIG. 1). The inner bag vacuum pressure 156 (FIG. 4) may be maintained on the inner bag chamber 166 (FIG. 1). In the one-stage cure cycle of FIG. 4, the composite layup 106 (FIG. 1) may be maintained at the elevated temperature 212 (FIG. 4) when re-venting the outer vacuum chamber 194 to the atmosphere 102. The composite layup 106 may be maintained at the same elevated temperature 212 as prior to the outer vacuum chamber venting period 226. In some examples, the elevated temperature 212 in FIG. 4 may be the cure temperature 216 of the composite layup 106.

Step 320 of the method 300 may include applying compaction pressure 164 (FIG. 2—e.g., atmospheric pressure) of the vacuum bag 150 (FIG. 1) against the composite layup 106 (FIG. 1) in response to re-venting the outer vacuum chamber 194 (FIG. 1) to the atmosphere 102 (FIG. 1). Advantageously, the above-described outgassing and consolidation of the inner bag chamber seal 158 (FIG. 1) during the outer vacuum chamber venting period 226 (e.g., t2-t3 in FIG. 4) may improve the effectiveness of the inner bag chamber seal 158 in maintaining the vacuum integrity of the inner bag chamber 166 and which may decrease the amount of air introduced into the composite layup 106 (FIG. 1) during cure and may result in an increase in the magnitude of compaction pressure 164 (FIG. 2) that may be applied on the composite layup 106 (FIG. 1) when the outer vacuum chamber 194 is re-vented to the atmosphere 102 at t4 in FIG. 4. The application of compaction pressure 164 (FIG. 2) on the composite layup 106 may be continued until the completion of consolidation and curing of the composite layup 106. In FIG. 4, the composite layup 106 may be maintained at the elevated temperature 212 until the temperature cool-down 218 period at t5. During the temperature cool-down 218 period from t5-t6 in FIG. 4, the temperature of the composite layup 106 may be reduced from the elevated temperature 212 down to ambient temperature 210. The temperature cool-down 218 of the composite layup 106 (FIG. 1) may be continuous and may be performed at a substantially constant rate from the elevated temperature 212 to ambient temperature 210 at which point the curing of the composite layup 106 may be substantially complete and resulting in a cured composite article 118 (FIG. 5).

FIG. 6 is an illustration of a flowchart having one or more operations that may be included in a method 400 (FIG. 7) of curing a composite layup 106 (FIG. 1) in a two-stage process 402, and corresponds to FIG. 7 which illustrates a graph of temperature 200, time 202, and vacuum pressure 204 in an example of the two-stage process 402. The two-stage process 402 illustrated in FIGS. 6-7 is similar to the above-described one-stage process 302 illustrated in FIGS. 3-4, with the difference being that in the one-stage process 302 (FIGS. 3-4), the composite layup 106 (FIG. 1) is heated to a single elevated temperature 212 (FIG. 4) for consolidation and curing, versus the two-stage process 402 (FIGS. 6-7) wherein the composite layup 106 is initially heated to an intermediate temperature 214 (FIG. 7) for outgassing of the composite layup 106 and then the temperature is ramped up to a cure temperature 216 (FIG. 7) for consolidating and curing the composite layup 106, as described in greater detail below. As described above, the method 400 (FIG. 7) of the two-stage curing process 402 may include laying up one or more composite plies 110 (FIG. 1—e.g., prepreg composite plies) on a forming tool 104 (FIG. 1) to form a composite layup 106 (FIG. 1). Alternatively, as indicated above, the composite layup 106 may be formed of dry fiber plies (not shown) which may be later infused with resin (not shown) prior to initiating the two-stage process 402 illustrated in FIG. 6-7.

Step 402 of the method 400 of FIG. 6 may include bagging the composite layup 106 (FIG. 1) under a flexible vacuum bag 150 (FIG. 1) as described above in Step 302 (FIG. 3), and may include additional layers (not shown) such as a breather layer (not shown), a separator film (not shown), a caul plate (not shown), and/or other materials or layers. The vacuum bag 150 may be sealed to the forming tool 104 (FIG. 1) with an inner bag chamber seal 158 (FIG. 1) to form an inner bag chamber 166 (FIG. 1) defined as the space between the vacuum bag 150 and the forming tool 104, as described above. Step 404 of the method 400 of FIG. 6 may include sealing a rigid shroud 180 (FIG. 1) to the forming tool 104 using a shroud seal 188 (FIG. 1) as described above in Step 304 (FIG. 3). Step 406 of the method 400 may include applying an inner bag vacuum pressure 156 (FIG. 7) to the inner bag chamber 166 (FIG. 1) and an outer vacuum pressure 186 (FIG. 7) to the outer vacuum chamber 194 (FIG. 1) wherein the inner bag vacuum pressure 156 is no less than the outer vacuum pressure 186, as illustrated at t0 in FIG. 7 and as described above in Step 306 (FIG. 3). As shown in FIG. 7 and described above, in some examples, the inner bag vacuum pressure 156 may be substantially equal to the outer vacuum pressure 186. However, to avoid the possibility of the vacuum bag 150 being pulled away from the forming tool 104 in the event that the outer vacuum pressure 186 is slightly higher than the inner bag vacuum pressure 156, and to ensure that the inner bag chamber seal 158 remains sealed to the forming tool 104, the inner bag vacuum pressure 156 may be applied at a level of between 0.5-1.5 in. Hg higher (e.g., the pressure differential 192 in FIG. 7) than the outer vacuum pressure 186, as described above.

Step 408 of the method 400 of FIG. 6 may include increasing the temperature of the composite layup 106 (FIG. 1) during a first temperature ramp 206 (e.g., from t0-t1 in FIG. 7) from ambient temperature 210 (e.g., 68-72° F.) to an intermediate temperature 214 as shown in FIG. 7 and which may be lower than the cure temperature 216 (FIG. 7). In one example, the intermediate temperature 214 may be lower than the temperature at which the resin (not shown) in the composite layup 106 starts to cross-link and polymerize. For a given material system (not shown) of the composite layup 106, the intermediate temperature 214 may be in the range of approximately 100-220° F. (e.g., between 155-165° F. for epoxy resin) and the cure temperature 216 may be in the range of from 300-400° F. (e.g., between 345-365° F. for epoxy resin). However, the composite layup 106 (FIG. 1) material system may require an intermediate temperature 214 that is outside the range of 100-220° F. and a cure temperature 216 that is outside the range of 250-400° F. The composite layup 106 may be heated simultaneously with (e.g., at t0 in FIG. 7) or shortly after (e.g., within several minutes of) the application of the inner bag vacuum pressure 156 on the inner bag chamber 166 and the outer vacuum pressure 186 on the outer vacuum chamber 194, in a manner similar to the above-described Step 308 (FIG. 3). The method 400 may include maintaining the composite layup 106 (FIG. 1) at the intermediate temperature 214 for the duration of an intermediate temperature hold period 222 (e.g., from t1-t4 in FIG. 7) during which the viscosity of the resin in the composite layup 106 may be reduced.

Step 410 of the method 400 of FIG. 6 may include drawing moisture 112 (FIG. 1), air 114 (FIG. 1), and/or volatiles 116 (FIG. 1) from the composite layup 106 (FIG. 1) toward the bag vacuum port 152 (FIG. 1) as described above in Step 306 (FIG. 3) while maintaining the temperature of the composite layup 106 at the intermediate temperature 214 (FIG. 7) and while maintaining the inner bag vacuum pressure 156 (FIG. 7) on the inner bag chamber 166 (FIG. 1) and the outer vacuum pressure 186 (FIG. 7) on the outer vacuum chamber 194 (FIG. 1). As described above in Step 306, the increased temperature (e.g., the intermediate temperature 214) of the composite layup 106 (FIG. 1) may cause the air 114 (e.g., containing moisture 112) and volatiles 116 in the composite layup 106 to expand and evacuate through the reduced-viscosity resin (not shown) while there is little (e.g., less than 1 psi) or no net compaction pressure 164 (FIG. 2) on the composite layup 106 during the intermediate temperature hold period 222 (e.g., from t0-t4 in FIG. 7).

Step 412 of the method 400 of FIG. 6 may include venting the outer vacuum chamber 180 (FIG. 1) to the atmosphere 102 (e.g., at t2 in FIG. 7) to initiate an outer vacuum chamber venting period 226 (e.g., from t2-t3 in FIG. 7) during the intermediate temperature hold period 222 (e.g., from t1-t4 of FIG. 7). As described above in Step 312, the shroud 180 may be vented to the atmosphere 102 (FIG. 1) by opening a shroud vacuum port 182 (FIG. 1) and de-activating the shroud vacuum source 184 (FIG. 1) thereby halting the application of outer vacuum pressure 186 (FIG. 7) on the outer vacuum chamber 194 (FIG. 1). As also described above in Step 312, the outer vacuum chamber venting period 226 (FIG. 7) may be initiated once all locations of the composite layup 106 (FIG. 1) are within a predetermined range of the intermediate temperature 214. For example, for a composite layup 106 instrumented with thermocouples 122 (FIG. 1) at multiple locations on the composite layup 106, the outer vacuum chamber venting period 226 may be initiated no earlier than when the temperature sensed by each thermocouple is within 10° F. (e.g., 155° F.) of the intermediate temperature 214 (e.g., 165° F.). Step 412 of FIG. 6 may include maintaining the composite layup 106 approximately at the intermediate temperature 214 (e.g., within 10° F.) during the outer vacuum chamber venting period 226 (FIG. 7).

Step 414 of the method 400 of FIG. 6 may include applying compaction pressure 164 (FIG. 2—e.g., atmospheric pressure) to the inner bag chamber seal 158 (FIG. 1) and composite layup 106 (FIG. 1) during the outer vacuum chamber venting period 226 (e.g., from t2-t3 in FIG. 7) the same manner as described above in Step 312 of FIG. 300. As mentioned above, the application of compaction pressure 164 (FIG. 2) may facilitate the degassing of air 114 and/or volatiles 116 from the inner bag chamber seal 158 (FIG. 2) and which may be generated over time or as a result of heating of the inner bag chamber seal 158. The air 114 and/or volatiles 116 from the inner bag chamber seal 158 may be drawn toward the bag vacuum port 152 and/or the shroud vacuum port 182 during the outer vacuum chamber venting period 226. As discussed above in Step 312, the outer vacuum chamber venting period 226 (FIG. 7) may be continued for a predetermined period of time during which the inner bag chamber seal 158 (FIG. 1) may be outgassed and consolidated to thereby improve the effectiveness of the inner bag chamber seal 158 in maintaining a vacuum-tight seal of the vacuum bag 150 with the forming tool 104 for the duration of the two-stage cure cycle 402 (FIG. 7). As indicated above, the improvement in the effectiveness of the inner bag chamber seal 158 during the outer vacuum chamber venting period 226 (FIG. 7) may decrease the amount of air that is introduced into the composite layup 106 (FIG. 1) during cure and may increase the magnitude of compaction pressure 164 (FIG. 2) that can be applied to the composite layup 106 during the remainder of the two-stage cure cycle 402. A decrease in air leaks and an increase in compaction pressure 164 (FIG. 2) on the composite layup 106 during cure may result in a reduction in voids (not shown) in the composite layup 106 and a corresponding increase in the mechanical properties of the cured composite article 118, as described above.

Step 416 of the method 400 of FIG. 6 may include halting the venting of the outer vacuum chamber 194 (FIG. 1) to the atmosphere 102 (FIG. 1) and re-applying the outer vacuum pressure 186 (FIG. 7) to the outer vacuum chamber 194 (e.g., at t3 in FIG. 7) to terminate the outer vacuum chamber venting period 226 (FIG. 7), in the same manner as described above in Step 316 of FIG. 3. The outer vacuum pressure 186 (FIG. 7) may be applied at the same level as prior to the outer vacuum chamber venting period 226 to achieve the same pressure differential 192 (FIG. 7) with the inner bag chamber 166 (FIG. 1) as prior to the outer vacuum chamber venting period 226. The termination of the outer vacuum chamber venting period 226 may allow the evacuation of moisture 112, air 114, and/or volatiles 116 from the composite layup 106 (FIG. 1) to continue at least for the remainder of the intermediate temperature hold period 222 (e.g., at least until t4 in FIG. 7). During the intermediate temperature hold period 222, the temperature of the composite layup 106 may be held relatively constant at the intermediate temperature 214.

Step 418 of the method 400 of FIG. 6 may include re-venting the outer vacuum chamber 194 (FIG. 1) to the atmosphere 102 (e.g., approximately at t4 in FIG. 7) to terminate the intermediate temperature hold period 222 (FIG. 7) by opening the shroud vacuum port 182 (FIG. 1) while maintaining the inner bag vacuum pressure 156 (FIG. 7) on the inner bag chamber 166 (FIG. 1), in a manner similar to the above-described Step 318 of FIG. 3. The shroud vacuum source 184 (FIG. 1) may be deactivated to halt the application of outer vacuum pressure 186 (FIG. 7) on the outer vacuum chamber 194. Step 420 of the method 400 may include applying compaction pressure 164 (FIG. 2—e.g., atmospheric pressure) of the vacuum bag 150 (FIG. 2) against the composite layup 106 (FIG. 2) in response to re-venting the outer vacuum chamber 194 (FIG. 2) to the atmosphere 102, in a manner similar to the above-described Step 320 of FIG. 3. As indicated above, the outgassing and consolidation of the inner bag chamber seal 158 during the outer vacuum chamber venting period 226 advantageously improves the effectiveness and integrity of the inner bag chamber seal 158 to allow for full vacuum pressure to be applied to the composite layup 106 without leakage of the inner bag chamber seal 158 for the remaining duration of the two-stage cure cycle 402 (FIG. 7).

Step 422 of the method 400 of FIG. 6 may include increasing the temperature of the composite layup 106 (FIG. 1) from the intermediate temperature 214 (FIG. 7) to the cure temperature 216 (FIG. 7) and holding the composite layup 106 at the cure temperature 216 during a cure temperature hold period 224 (FIG. 7). In Step 422, the temperature of the composite layup 106 may be increased at a substantially constant rate during a second temperature ramp 208 (e.g., from t4-t5 in FIG. 7) up to the cure temperature 216. The second temperature ramp 208 up to the cure temperature 216 may take 30 minutes to 1 hour or longer, although longer or shorter times are possible. As mentioned above, the cure temperature 216 may be specific for the given material system (e.g., resin composition) of the composite layup 106. In an example wherein the composite layup 106 includes epoxy resin (not shown), the cure temperature 216 may be in the range of approximately 345-365° F.

The method 400 may include maintaining the composite layup 106 at the cure temperature 216 (FIG. 7) during the cure temperature hold period 224 (e.g., from t5-t6 in FIG. 7). Depending upon the material system, the cure temperature hold period 224 (FIG. 7) may have a duration of approximately 1-3 hours or longer as may be required to advance the curing of the composite layup 106 (FIG. 1) toward completion. The method 400 may include decreasing the temperature of the composite layup 106 (e.g., from t6-t7 in FIG. 7) from the cure temperature 216 (FIG. 7) to ambient temperature 210 (FIG. 7) during a temperature cool-down 218 (FIG. 7) period which may be performed continuously and at a substantially constant rate and resulting in a cured composite article 118 (FIG. 5).

Figure 8:
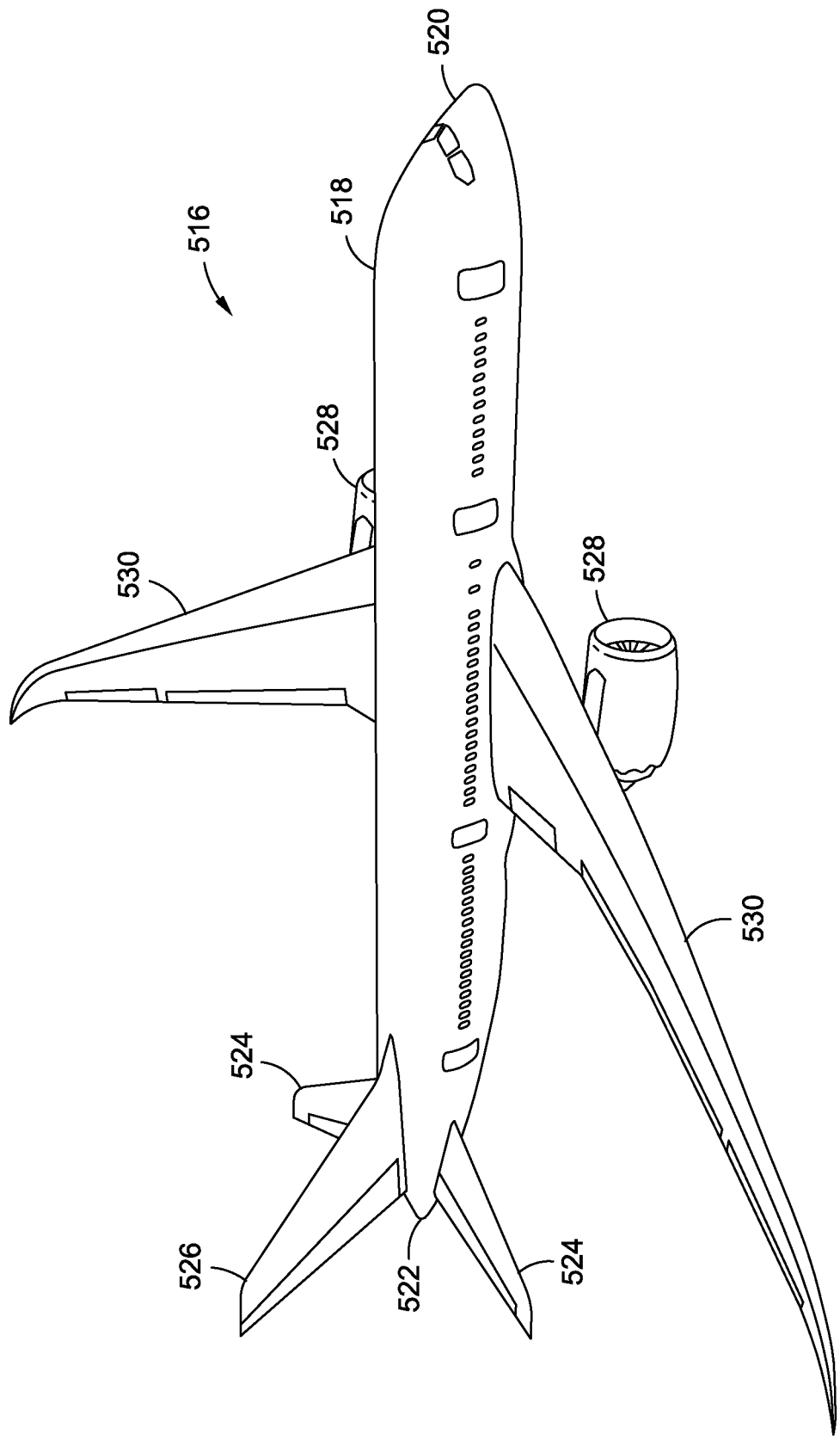
FIG. 8 is an illustration of an aircraft including one or more composite articles that may be manufactured using one or more examples of the methods disclosed herein.

FIG. 8 is an illustration of a perspective view of an aircraft 516 including one or more composite articles 118 (FIG. 3) that may be manufactured using one or more examples of the methods 300, 400 (FIGS. 3 and 6) disclosed herein. The aircraft 516 may include a fuselage 518 having a nose 520 at a forward end and an empennage 522 at an aft end. The empennage 522 may include a vertical tail 526 and one or more horizontal tails 524. In addition, the aircraft 516 may include a pair of wings 530 extending outwardly from the fuselage 518. One or more propulsion units 528 may be included with the aircraft 516. For example, the propulsion units 528 may be supported on the wings 530.

Although FIG. 8 is generally representative of a commercial aircraft 516, the methods 300, 400 (FIGS. 3 and 6) disclosed herein may be implemented for manufacturing composite articles 118 (FIG. 5) for any type of aircraft including commercial, civilian, and military aircraft including fixed-wing aircraft, rotary-wing aircraft and any one of a variety of other types of air vehicles. Furthermore, the methods 300, 400 (FIGS. 3 and 6) disclosed herein may be implemented for manufacturing composite articles 118 (FIG. 5) that may be used on space vehicles including, but not limited to, missiles, rockets, launch vehicles, satellites.

In addition, the methods 300, 400 (FIGS. 3 and 6) may be implemented for manufacturing composite articles 118 (FIG. 5) for land-based vehicles including any type of motor vehicles and any type of watercraft. In this regard, the methods 300, 400 (FIGS. 3 and 6) may be implemented for forming composite articles 118 (FIG. 5) for any type of vehicular or non-vehicular application, without limitation, including any type of system, assembly, subassembly, or structure including buildings and other land-based structures.

Figure 9:
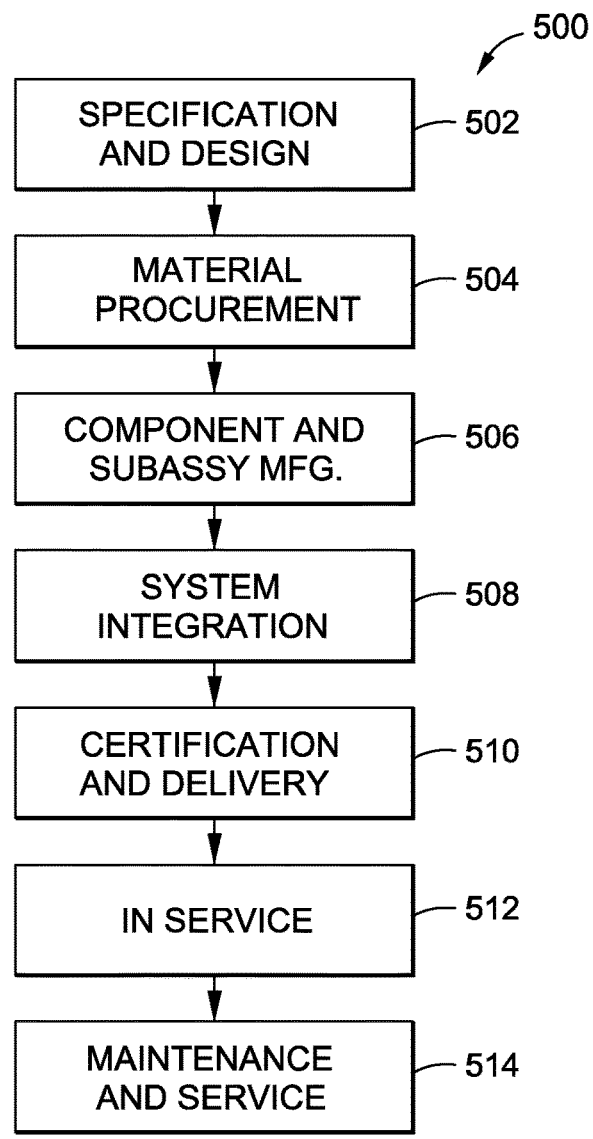
FIG. 9 is an illustration of a flow diagram of an aircraft production and service methodology.
Figure 10:
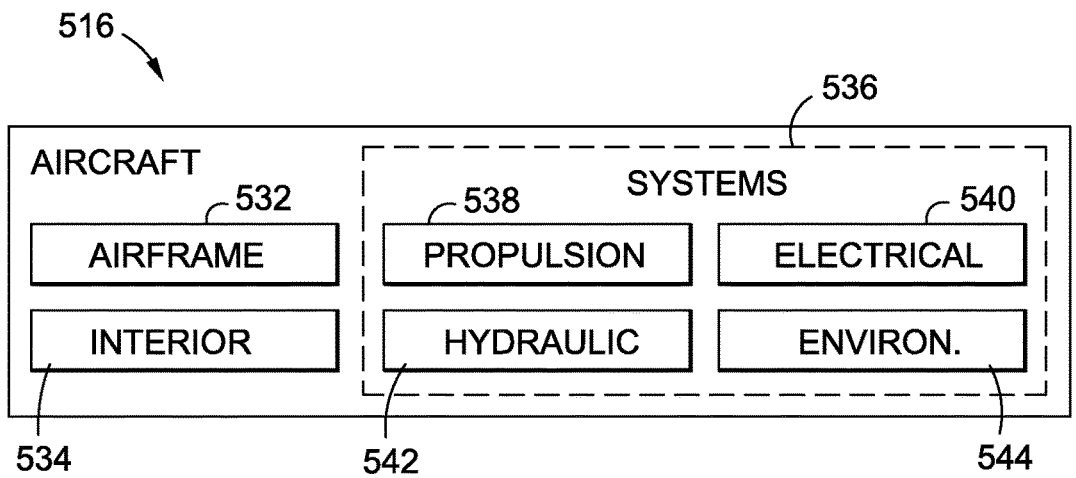
FIG. 10 is an illustration of a block diagram of an aircraft.

Referring to FIG. 9, embodiments of the present disclosure may be described in the context of an aircraft manufacturing and service method 500 as shown in FIG. 9 and an aircraft 516 as shown in FIG. 10. During pre-production, exemplary method 500 may include specification and design 502 of the aircraft 516 and material procurement 504. During production, component and subassembly manufacturing 506 and system integration 508 of the aircraft 516 takes place. Thereafter, the aircraft 516 may go through certification and delivery 510 in order to be placed in service 512. While in service 512 by a customer, the aircraft 516 is scheduled for routine maintenance and service 514 (which may also include modification, reconfiguration, refurbishment, and so on). As mentioned below, the presently-disclosed methods 300, 400 (FIGS. 3 and 6) may be implemented during production, component and subassembly manufacturing 506. For example, the methods 300, 400 (FIGS. 3 and 6) may be implemented for production, component and subassembly manufacturing, modification, reconfiguration, and/or refurbishment of any one of a variety of different aircraft components (not shown) of the aircraft 516 including, but not limited to, the airframe 630 and/or the interior 632 of the aircraft 516.

Each of the processes of method 500 (FIG. 9) may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 516 produced by exemplary method 500 may include an airframe 630 with a plurality of high-level systems 634 and an interior 632. Examples of high-level systems 634 include one or more of a propulsion system 636, an electrical system 638, a hydraulic system 640, and an environmental system 642. Any number of other systems 634 may be included. The presently-disclosed methods 300, 400 (FIGS. 3 and 6) may be implemented during production, component and/or subassembly manufacturing 506 of the aircraft 516 (FIG. 10) and/or during system integration 508 of the aircraft 516. For example, the methods 300, 400 (FIGS. 3 and 6) may be implemented for manufacturing composite articles 118 (FIG. 5) that may be incorporated into the airframe 630 such as the fuselage 518 (FIG. 8), the vertical tail 526 (FIG. 8), the horizontal tails 524 (FIG. 8), and/or the wings 530 (FIG. 8). The methods 300, 400 (FIGS. 3 and 6) may also be implemented for manufacturing any one or more aircraft components that may be included in one or more high-level system 634 and/or in the interior 632 of the aircraft 516. Although an aerospace example is shown, the principles of the invention may be applied to other industries, such as the automotive industry.

Apparatus and methods embodied herein may be employed during any one or more of the stages of the production and service method 500 (FIG. 9). For example, components or subassemblies corresponding to production process may be fabricated or manufactured in a manner similar to components or subassemblies produced while the aircraft 516 (FIG. 8) is in service. Also, one or more apparatus embodiments, method embodiments, or a combination thereof may be utilized during the production stages and, for example, by substantially expediting assembly of or reducing the cost of an aircraft 516. Similarly, one or more of apparatus embodiments, method embodiments, or a combination thereof may be utilized while the aircraft 516 is in service, for example and without limitation, in maintenance and service 514 (FIG. 9).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of preventing leakage of an inner bag chamber seal of a vacuum bag during curing of a composite layup, comprising:
   applying an inner bag vacuum pressure to an inner bag chamber and an outer vacuum pressure to an outer vacuum chamber, the inner bag chamber being formed by a vacuum bag covering the composite layup and sealed to a forming tool by the inner bag chamber seal, the inner bag vacuum pressure being no less than the outer vacuum pressure;
   increasing a temperature of the composite layup to an elevated temperature to initiate a temperature hold period;
   venting the outer vacuum chamber to atmosphere to initiate an outer vacuum chamber venting period during the temperature hold period;
   applying compaction pressure to the inner bag chamber seal in response to venting the outer vacuum chamber during the outer vacuum chamber venting period, at least until at least one of the following occurs:
      a majority of air and/or volatiles is removed from the inner bag chamber seal;
      an outgassing rate of air and/or volatiles from the inner bag chamber seal falls below 50 percent of a maximum outgassing rate; and
   re-applying the outer vacuum pressure to the outer vacuum chamber to terminate the outer vacuum chamber venting period.

2. The method of claim 1, further including:
   bagging the composite layup under the vacuum bag.

3. The method of claim 1, further including:
   drawing moisture, air, and/or volatiles from the composite layup toward a bag vacuum port during the temperature hold period.

4. The method of claim 1, wherein:
   the inner bag chamber seal is initially an uncured sealant that cures over time.

5. The method of claim 4, wherein:
   the uncured sealant is a butyl rubber sealant.

6. The method of claim 1, wherein the step of applying the inner bag vacuum pressure and the outer vacuum pressure includes:
   applying the inner bag vacuum pressure at a level equal to the outer vacuum pressure.

7. The method of claim 1, wherein the step of applying the inner bag vacuum pressure and the outer vacuum pressure includes:
applying the inner bag vacuum pressure at a level between 0.5-1.5 in. Hg higher than the outer vacuum pressure.

8. The method of claim 1, wherein the step of venting the outer vacuum chamber to atmosphere includes:
initiating the outer vacuum chamber venting period when all locations of the composite layup are within 10° F. of the elevated temperature.

9. The method of claim 1, wherein the composite layup includes thermocouples mounted at different locations on the composite layup, the step of venting the outer vacuum chamber to atmosphere includes:
initiating the outer vacuum chamber venting period when the temperature sensed by all of the thermocouples reaches the elevated temperature.

10. The method of claim 1, wherein the step of applying compaction pressure to the inner bag chamber seal during the outer vacuum chamber venting period includes:
drawing air and volatiles from the inner bag chamber seal toward at least one of a bag vacuum port and a shroud vacuum port.

11. The method of claim 1, wherein the step of re-applying the outer vacuum pressure to the outer vacuum chamber includes:
re-applying the outer vacuum pressure to the outer vacuum chamber at the same level as prior to the outer vacuum chamber venting period.

12. The method of claim 1, further including:
re-venting the outer vacuum chamber to atmosphere after terminating the outer vacuum chamber venting period.

13. A method of manufacturing a composite article, comprising:
applying an inner bag vacuum pressure to an inner bag chamber and an outer vacuum pressure to an outer vacuum chamber, the inner bag chamber being formed by a vacuum bag covering a composite layup and sealed to a forming tool by an inner bag chamber seal which foams at least during the application of the outer vacuum pressure, the inner bag vacuum pressure being no less than the outer vacuum pressure;
increasing a temperature of the composite layup to an elevated temperature to initiate a temperature hold period;
venting the outer vacuum chamber to atmosphere to initiate an outer vacuum chamber venting period during the temperature hold period;
applying compaction pressure to the inner bag chamber seal in response to venting the outer vacuum chamber during the outer vacuum chamber venting period, at least until foaming of the inner bag chamber seal ceases; and
re-applying the outer vacuum pressure to the outer vacuum chamber to terminate the outer vacuum chamber venting period.

14. The method of claim 13, wherein:
the inner bag chamber seal is initially an uncured sealant that cures over time.

15. The method of claim 14, wherein:
the uncured sealant is a butyl rubber sealant.

16. The method of claim 13, wherein the step of venting the outer vacuum chamber to atmosphere includes:
initiating the outer vacuum chamber venting period when all locations of the composite layup are within 10° F. of the elevated temperature.

17. The method of claim 13, wherein the step of applying compaction pressure to the inner bag chamber seal includes:
drawing air and volatiles from the inner bag chamber seal toward at least one of a bag vacuum port and a shroud vacuum port.

18. The method of claim 13, further including:
bagging the composite layup under the vacuum bag.

19. A method of manufacturing a composite article, comprising:
applying an inner bag vacuum pressure to an inner bag chamber and an outer vacuum pressure to an outer vacuum chamber, the inner bag chamber being formed by a vacuum bag covering a composite layup and sealed to a forming tool by an inner bag chamber seal, the inner bag vacuum pressure being no less than the outer vacuum pressure;
increasing a temperature of the composite layup to an elevated temperature to initiate a temperature hold period;
venting the outer vacuum chamber to atmosphere to initiate an outer vacuum chamber venting period during the temperature hold period;
applying compaction pressure to the inner bag chamber seal in response to venting the outer vacuum chamber during the outer vacuum chamber venting period, at least until the composite layup is consolidated to a level of no more than 20% of a total amount of consolidation of the composite layup when cured; and
re-applying the outer vacuum pressure to the outer vacuum chamber to terminate the outer vacuum chamber venting period.

20. The method of claim 19, further including:
bagging the composite layup under the vacuum bag.

21. The method of claim 19, wherein:
the inner bag chamber seal is initially an uncured sealant that cures over time.

22. The method of claim 21, wherein:
the uncured sealant is a butyl rubber sealant.

* * * * *